(12) United States Patent
Ceresoli

(10) Patent No.: US 11,678,027 B2
(45) Date of Patent: Jun. 13, 2023

(54) TECHNOLOGIES FOR COMMUNICATING AN ENHANCED EVENT EXPERIENCE

(71) Applicant: Pacers Basketball, LLC, Indianapolis, IN (US)

(72) Inventor: Carl Ceresoli, Zionsville, IN (US)

(73) Assignee: Pacers Basketball, LLC, Indianapolis, IN (US)

( * ) Notice: Subject to any disclaimer, the term of this patent is extended or adjusted under 35 U.S.C. 154(b) by 0 days.

(21) Appl. No.: 17/175,617

(22) Filed: Feb. 13, 2021

(65) Prior Publication Data

US 2021/0258656 A1    Aug. 19, 2021

Related U.S. Application Data

(60) Provisional application No. 62/976,301, filed on Feb. 13, 2020.

(51) Int. Cl.
*H04N 21/81* (2011.01)
*H04N 21/233* (2011.01)
*H04N 21/262* (2011.01)
*H04N 21/472* (2011.01)
*G06V 20/40* (2022.01)

(52) U.S. Cl.
CPC ......... *H04N 21/8126* (2013.01); *G06V 20/42* (2022.01); *H04N 21/233* (2013.01); *H04N 21/2625* (2013.01); *H04N 21/47214* (2013.01)

(58) Field of Classification Search
CPC ............ H04N 21/8126; H04N 21/233; H04N 21/2625; H04N 21/47214; G06K 9/00724; G06V 20/42
See application file for complete search history.

(56) References Cited

U.S. PATENT DOCUMENTS

| | | | |
|---|---|---|---|
| 2013/0205321 A1* | 8/2013 | Sinha | G06T 1/0021 725/19 |
| 2014/0337346 A1* | 11/2014 | Barthel | G06F 16/22 707/738 |
| 2016/0323612 A1* | 11/2016 | Stewart | H04N 21/64707 |
| 2018/0121996 A1* | 5/2018 | Gandhi | H04R 1/1041 |
| 2019/0030435 A1* | 1/2019 | Dishman | A63F 13/77 |

FOREIGN PATENT DOCUMENTS

| | | | |
|---|---|---|---|
| WO | 2015148693 A1 | 10/2015 | |
| WO | WO-2015148693 A1 * | 10/2015 | G06Q 30/0277 |

OTHER PUBLICATIONS

International Search Report and Written Opinion in PCT/US21/18053, International Searching Authority, dated May 4, 2021, pp. 1-16.

* cited by examiner

*Primary Examiner* — Sumaiya A Chowdhury
(74) *Attorney, Agent, or Firm* — Ice Miller LLP

(57) ABSTRACT

One or more devices, systems, methods, may implement one or more techniques to provide sporting event content to a consumer. One or more techniques may identify a sporting event content from a remote storage location, perhaps based on a received audio feed and/or a video feed. The audio feed and/or the video feed may be time coded. The sporting event content may be received via a stream. The sporting event content stream may be time aligned based at least on the time code. An audio content of the sporting event content stream may be provided to a consumer who may have requested the sporting event content via a speaker device. A video content of the sporting event content stream may be provided to the consumer via a display device.

19 Claims, 10 Drawing Sheets

TECHNOLOGIES FOR COMMUNICATING AN ENHANCED EVENT EXPERIENCE

RELATED APPLICATION

This application claims the benefit of U.S. Provisional Application No. 62/976,301, filed on Feb. 13, 2020. The disclosure of this prior application is incorporated herein by reference in its entirety for all purposes.

BACKGROUND

In many sports arenas, attendees can enjoy the live action of one or more sporting events, along with the clamor generated by the multitudes of fellow enthusiasts who have traveled to the arena to enjoy the sporting spectacle in-person.

Fans attending the sporting event live and in person may have the benefit of hearing a number of sounds and/or seeing a number of images that perhaps sports fans watching the sporting event remotely (e.g., via broadcast television, satellite television, cable television, Internet streaming, etc.) and/or in delayed time (e.g., a rebroadcast, a recording, etc.) may not be able to observe and/or hear—let alone enjoy.

For example, sports fans physically attending a sporting event in an arena may hear and/or observe players voices/sounds, coaches' voices and gestures, sporting officials' voices and gestures, local arena announcements, and or arena alerts pertaining to the sporting event, etc.

The sporting fans that monitor the sporting event remotely, and/or in a time-delayed fashion, might not be able to hear and/or observe all of those same sights and sounds. Indeed, depending on their seating placement, perhaps not all sports fans attending the sporting event live and in person in the arena may hear and/or observe all of the aforementioned sights and sounds that occur before, during, and somewhat after the sporting event.

SUMMARY

The present disclosure includes disclosure of one or more devices, systems, and/or methods, that may implement one or more techniques to provide a sporting event content application. The sporting event content application may enable an enhanced audio and/or an enhanced video experience for televised sporting events, perhaps for example though an in-home smart speaker, mobile device (e.g., smart phone), a personal computer (PC), a gaming console, and/or a virtual reality (VR) headset.

The present disclosure includes disclosure of one or more techniques that may leverage cloud-based time encoded content and/or an in-device microphone array to identify and/or align (e.g., time align) televised content, perhaps for example regardless of broadcast delay and/or a digital video recorder (DVR) delay. Perhaps for example once a (e.g., real time, time delayed, and/or recorded and later replayed) televised sporting event and speakers and/or video device (e.g., in-home speakers and/or mobile smart device) are in sync, a sporting event enhanced audio and/or video experience may be delivered to a requesting (e.g., subscribing) consumer. The sporting event content may augment the broadcast of the sporting event for the consumer.

The present disclosure includes disclosure of at least one device for providing an event content stream. In one technique, such a device comprises a microphone; a speaker; a transceiver; and a processor, the processor configured at least to receive an audio feed via the microphone, assign a time code to the audio feed, receive an event content stream from a remote storage location, the event content stream corresponding at least to the audio feed, and the event content stream being time aligned based at least on the time code, and provide at least a part of the event content stream via at least the speaker. In one technique, such a device comprises a display, and the processor is configured to provide at least a part of the event content stream via at least the display. In one technique, such a device comprises a camera; and a display, and the processor is configured to receive a video feed via the camera, the event content stream further corresponding to the video feed; and provide at least a part of the event content stream via at least the display. In one technique, event content stream comprises an advertisement for a product, and the processor is configured to receive a second audio feed via the microphone, the second audio feed comprising at least an order for the product; and deliver the order to an order processor.

The present disclosure includes disclosure of at least one method for communicating an enhanced event experience. In one technique, such a method comprises the steps of obtaining, with a first device, broadcast information from a broadcast emitted from a second device; comparing the broadcast information to a time encoded recording; synchronizing the time encoded recording with the broadcast information; transmitting enhanced content to the first device, the enhanced content being based at least on the time encoded recording; and delivering the enhanced content by way of the first device, the enhanced content being in time alignment with the broadcast emitted from the second device. In at least one such method, the broadcast information is based at least on an audio feed of the broadcast. In at least one such method, the enhanced content comprises at least audio content. In at least one such method, the broadcast information is based at least on a video feed of the broadcast. In at least one such method, the enhanced content comprises at least video content. In at least one such method, the enhanced content comprises at least one advertisement. In at least one such method, the broadcast is of a sporting event. In at least one such method, the enhanced content comprises at least audio captured at the sporting event. In at least one such method, the method comprises the steps of identifying undesirable material in the enhanced content; and eliminating the undesirable material.

The present disclosure includes disclosure of at least one device for providing event content. In one technique, such a device comprises a memory, the memory comprising at least time encoded event content; a processor, the processor configured at least to receive a time encoded media sample; retrieve the time encoded event content; compare the time encoded event content to the time encoded media sample; and produce an event content stream, the event content stream comprising at least a portion of the time encoded event content that is selected based at least on time alignment with the time encoded media sample. In one such technique, the event content stream comprises at least one advertisement. In one such technique, the event content stream comprises at least one advertisement for a product, and the processor is further configured to receive an order for the product; and deliver the order to an order processor. In one such technique, the processor is configured to identify undesirable material in the event content stream; and eliminate the undesirable material, which may be obscene language.

BRIEF DESCRIPTION OF DRAWINGS

The embodiments and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
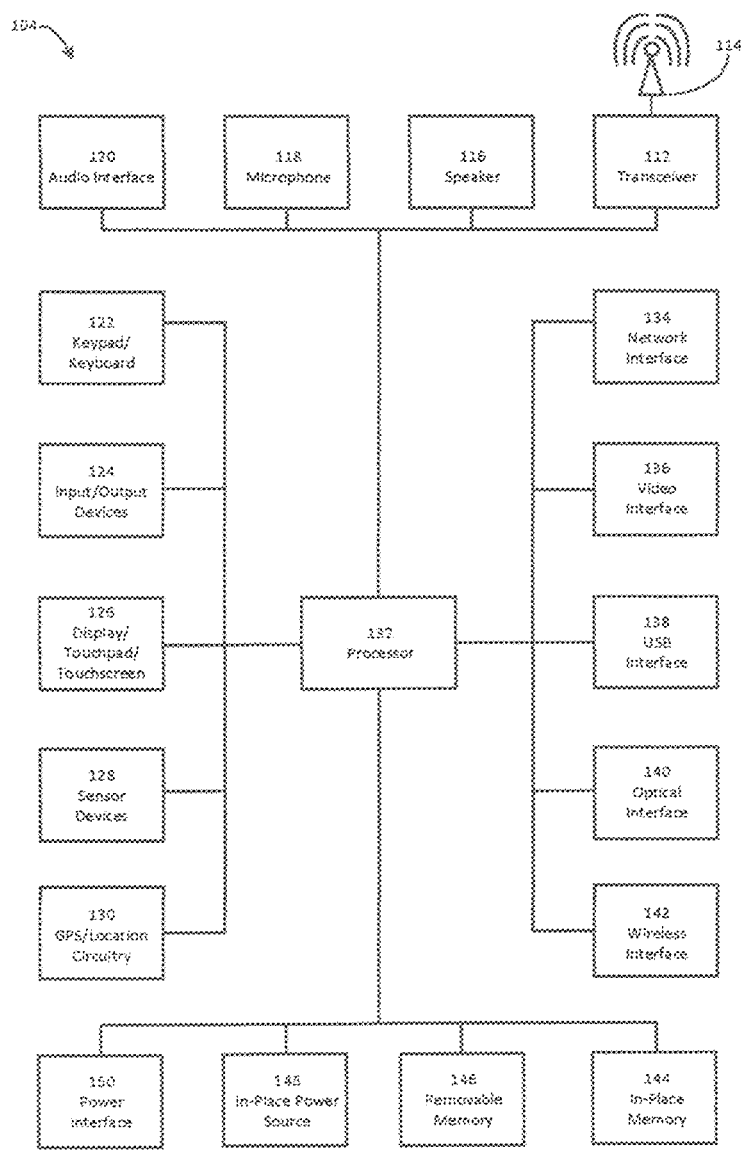
FIG. 1 is an example diagram of a computer/processing device wherein one or more of the techniques of the present disclosure may be implemented.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is a diagram of an example computer/computing (e.g., processing) device 104 that may implement one or more techniques described herein, in whole or at least in part, with respect to one or more of the devices, methods, and/or systems described herein. In FIG. 1, the computing device 104 may include one or more of: a processor 132, a transceiver 112, a transmit/receive element (e.g., antenna) 114, a speaker 116, a microphone 118, an audio interface (e.g., earphone interface and/or audio cable receptacle) 120, a keypad/keyboard 122, one or more input/output devices 124, a display/touchpad/touch screen 126, one or more sensor devices 128, Global Positioning System (GPS)/location circuitry 130, a network interface 134, a video interface 136, a Universal Serial Bus (USB) Interface 138, an optical interface 140, a wireless interface 142, in-place (e.g., non-removable) memory 144, removable memory 146, an in-place (e.g., removable or non-removable) power source 148, and/or a power interface 150 (e.g., power/data cable receptacle). The computing device 104 may include one or more, or any sub-combination, of the aforementioned elements.

The computing device 104 may take the form of a laptop computer, a desktop computer, a computer mainframe, a server, a terminal, a tablet, a smartphone, and/or a cloud-based computing device (e.g., at least partially), and/or the like.

The processor 132 may be a general-purpose processor, a special-purpose processor, a conventional processor, a digital-signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type of integrated circuit (IC), and/or a finite-state machine, and/or the like. The processor 132 may perform signal coding, data processing, power control, sensor control, interface control, video control, audio control, input/output processing, and/or any other functionality that enables the computing device 104 to serve as and/or perform as (e.g., at least partially) one or more of the devices, methods, and/or systems disclosed herein.

The processor 132 may be connected to the transceiver 112, which may be connected to the transmit/receive element 124. The processor 132 and the transceiver 112 may operate as connected separate components (as shown). The processer 132 and the transceiver 112 may be integrated together in an electronic package or chip (not shown).

The transmit/receive element 114 may be configured to transmit signals to, and/or receive signals from, one or more wireless transmit/receive sources (not shown). For example, the transmit/receive element 114 may be an antenna configured to transmit and/or receive RF signals. The transmit/receive element 114 may be an emitter/detector configured to transmit and/or receive IR, UV, or visible light signals, for example. The transmit/receive element 114 may be configured to transmit and/or receive RF and/or light signals. The transmit/receive element 114 may be configured to transmit and/or receive any combination of wireless signals.

Although the transmit/receive element 114 is shown as a single element, the computing device 104 may include any number of transmit/receive elements 114 (e.g., the same as for any of the elements 112-150). The computing device 104 may employ Multiple-Input and Multiple-Output (MIMO) technology. For example, the computing device 104 may include two or more transmit/receive elements 114 for transmitting and/or receiving wireless signals.

The transceiver 112 may be configured to modulate the signals that are to be transmitted by the transmit/receive element 114 and/or to demodulate the signals that are received by the transmit/receive element 114. The transceiver 112 may include multiple transceivers for enabling the computing device 104 to communicate via one or more, or multiple, radio access technologies, such as Universal Terrestrial Radio Access (UTRA), Evolved UTRA (E-UTRA), and/or IEEE 802.11, for example.

The processor 132 may be connected to, may receive user input data from, and/or may send (e.g., as output) user data to: the speaker 116, microphone 118, the keypad/keyboard 122, and/or the display/touchpad/touchscreen 126 (e.g., a liquid crystal display (LCD) display unit or organic light-emitting diode (OLED) display unit, among others). The processor 132 may retrieve information/data from and/or store information/data in, any type of suitable memory, such as the in-place memory 144 and/or the removable memory 146. The in-place memory 144 may include random-access memory (RAM), read-only memory (ROM), a register, cache memory, semiconductor memory devices, and/or a hard disk, and/or any other type of memory storage device.

The removable memory 146 may include a subscriber identity module (SIM) card, a portable hard drive, a memory stick, and/or a secure digital (SD) memory card, and/or the like. The processor 132 may retrieve information/data from, and/or store information/data in, memory that might not be physically located on the computing device 104, such as on a server, the cloud, and/or a home computer (not shown).

One or more of the elements 112-146 may receive power from the in-place power source 148. In-place power source 148 may be configured to distribute and/or control the power to one or more of the elements 112-146 of the computing device 104. The in-place power source 148 may be any suitable device for powering the computing device 104. For example, the in-place power source 148 may include one or more dry cell batteries (e.g., nickel-cadmium (NiCd), nickel-zinc (NiZn), nickel metal hydride (NiMH), lithium-ion (Li-ion), etc.), solar cells, and/or fuel cells, and/or the like.

Power interface 150 may include a receptacle and/or a power adapter (e.g., transformer, regulator, and/or rectifier) that may receive externally sourced power via one or more AC and/or DC power cables, and/or via wireless power transmission. Any power received via power interface 150 may energize one or more of the elements 112-146 of computing device 104, perhaps for example exclusively or in parallel with in-place power source 148. Any power received via power interface 150 may be used to charge in-place power source 148.

The processor 132 may be connected to the GPS/location circuitry 130, which may be configured to provide location information (e.g., longitude and/or latitude) regarding the current location of the computing device 104. The computing device 104 may acquire location information by way of any suitable location-determination technique.

The processor 132 may be connected to the one or more input/output devices 124, which may include one or more software and/or hardware modules that provide additional features, functionality and/or wired and/or wireless connectivity. For example, the one or more input/output devices 124 may include a digital camera (e.g., for photographs and/or video), a hands free headset, a digital music player, a media player, a frequency modulated (FM) radio unit, an Internet browser, and/or a video game player module, and/or the like.

The processor 132 may be connected to the one or more sensor devices 128, which may include one or more software and/or hardware modules that provide additional features, functionality and/or wired and/or wireless connectivity. For example, the one or more sensor devices 128 may include an accelerometer, an e-compass, and/or a vibration device, and/or the like.

The processor 132 may be connected to the network interface 134, which may include one or more software and/or hardware modules that provide additional features, functionality and/or wireless and/or wired connectivity. For example, the network interface 134 may include a Network Interface Controller (NIC) module, a Local Area Network (LAN) module, an Ethernet module, a Physical Network Interface (PNI) module, and/or an IEEE 802 module, and/or the like.

The processor 132 may be connected to the video interface 136, which may include one or more software and/or hardware modules that provide additional features, functionality and/or wired and/or wireless connectivity. For example, the video interface 136 may include a High-Definition Multimedia Interface (HDMI) module, a Digital Visual Interface (DVI) module, a Super Video Graphics Array (SVGA) module, and/or a Video Graphics Array (VGA) module, and/or the like.

The processor 132 may be connected to the USB interface 138, which may include one or more software and/or hardware modules that provide additional features, functionality and/or wired and/or wireless connectivity. For example, the USB interface 138 may include a universal serial bus (USB) port, and/or the like.

The processor 132 may be connected to the optical interface 140, which may include one or more software and/or hardware modules that provide additional features, functionality and/or wired and/or wireless connectivity. For example, the optical interface 140 may include a read/write Compact Disc module, a read/write Digital Versatile Disc (DVD) module, and/or a read/write Blu-ray™ disc module, and/or the like.

The processor 132 may be connected to the wireless interface 142, which may include one or more software and/or hardware modules that provide additional features, functionality and/or wireless connectivity. For example, the wireless interface 142 may include a Bluetooth® module, an Ultra-Wideband (UWB) module, a ZigBee module, and/or a Wi-Fi (IEEE 802.11) module, and/or the like.

One or more techniques described herein may be applied to a professional, college, and/or other level court-based basketball game. One or more of the disclosed techniques may be applied to other sports/spectacles such as but not limited to: a professional, college, and/or other level football field/arena; a professional, college, and/or other level baseball field/area; a professional, college, and/or other level ice-hockey rink/arena; a tennis court/arena; a lacrosse field/arena; a volleyball sand-based court and/or hard-surface court/arena; a professional, college, and/or other level soccer field/arena; a rugby field/arena; a bowling alley/arenas; a competitive swimming pool/arena; a snow-skiing venue; and/or a track & field course/area; among other sport fields/tracks/pools/courses/venues/arenas.

One or more techniques described herein may use venue/arena based audio/video equipment, one or more application programming interfaces (API), and/or one or more applications (e.g., web-based applications) to provide the sporting event experience.

Amazon, Google, and/or Sonos, among others, may be useful partners with which to practice one or more techniques described herein. In one or more techniques, a partner device and/or a consumer's mobile device, perhaps for example upon a consumer command, may take a sample of in-home TV audio and/or video, for example perhaps based on a requested service of the sporting event content application. The sample may be compared to one or more content libraries (e.g., Internet/Cloud based) via one or more APIs, for example.

In one or more techniques, perhaps for example once at least one sample is identified, the consumer's device may stream the requested content corresponding to a sporting event broadcast (e.g., via television, radio, cable, satellite the consumer may be viewing. The streamed requested content may be in substantial time alignment (e.g., relatively perfect time alignment, perhaps based on average human perception) with the sporting event broadcast that the consumer is receiving (e.g., perhaps regardless of delay, replay, and/or DVR activity).

In one or more techniques, one or more augmented services/content can be requested via a partner device and/or the consumer's mobile device, perhaps enhancing advertisements made during the sports event broadcast and/or original broadcast, such as direct product fulfillment and/or requests for additional information for advertised goods and/or services.

One or more techniques disclosed herein enabled enhanced application audio and/or video distribution to one or more recipients. One or more techniques described herein might not change existing broadcast processes or technology. One or more techniques may enhance the "in-home" experience with audio and/or video sights and sounds that enhance and/or compliment a conventional broadcast of the sporting event. One or more techniques may be activated by at least one consumer request for pairing sporting event content with a broadcast sporting event.

In one or more techniques, for example for an enhanced audio experience, a synchronization routine may be conducted with the consumer's smart speaker and/or a consumer's mobile device. The consumer's smart speaker and/or mobile device may play sound taking place on, near, and/or around the court in substantial time alignment with a television broadcast of the sporting event, for example. The substantial time alignment may be arranged regardless of whether the broadcast of the sporting event was made in real time, somewhat delayed in time, or from a past recording of the sporting event.

For example, the sporting event content may provide sounds including arena noises, player voices and/or dialog, officials' voices and/or dialog, and/or coaching staff voices and/or dialog.

For example, the sporting event content may provide an enhanced video experience (and/or an enhanced audio experience), the consumer's mobile device and/or smart speaker with video capability may act as a 360-degree window to the sporting event (and/or some level of video coverage from various angles), perhaps providing sights from the arena, players, crowd, officials, and/or coaches, and/or graphically generated content and/or virtual reality (VR) content. The consumer's smart speaker with video capability and/or mobile device may provide the enhanced video content in substantial time alignment with a television broadcast of the sporting event, for example. The substantial time alignment may be arranged regardless of whether the broadcast of the sporting event was made in real time, somewhat delayed in time, or from a past recording of the sporting event.

Figure 2:
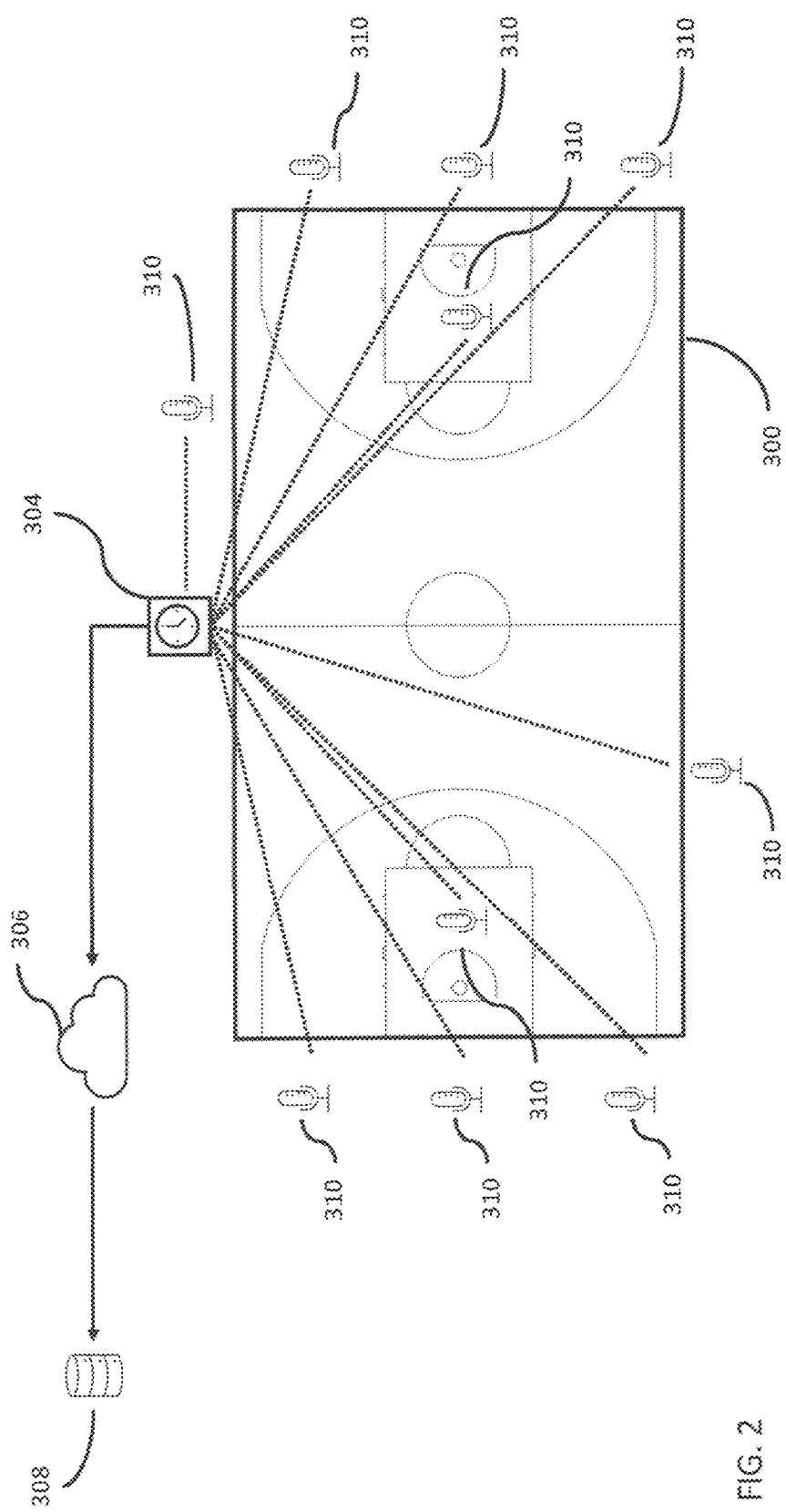
FIG. 2 illustrates an example of application audio processing techniques according to the present disclosure.

FIG. 2 illustrates an example of application audio processing techniques. One or more techniques may leverage one or more audio assets that may be available in venues/arenas hosting sporting events. In one or more techniques, microphones may be placed around the field-of-play that may send captured audio to a control unit. One or more recordings may be time encoded and/or exported to one or more storage locations (e.g., a cloud-based storage facility).

Shown in FIG. 2 are a plurality of audio capture devices 310, such as, for example, microphones, installed in various locations near sport venue 300. In one or more techniques, audio capture devices 310 may send captured audio to a processing unit 304. In at least one technique, processing unit 304 comprises one or more computing devices 104 configured by way of hardware, firmware, software, and/or circuitry, and/or a combination thereof to perform the functions described herein. Any such firmware and/or software may be embodied in or on computer readable media. One or more such recordings may be time encoded by processing unit 304 and/or exported by processing unit 304 to one or more storage locations 308 (e.g., a cloud-based storage facility). In at least one technique, a storage location 308 comprises one or more computing devices 104 configured by way of hardware, firmware, software, and/or circuitry and/or a combination thereof to perform the functions described herein. Any such firmware and/or software may be embodied in or on computer readable media. In at least one technique, one or more such recordings may be exported by processing unit 304 to one or more storage locations 308 via network 306.

Network 306 may be implemented as any type of wired and/or wireless network, including a local area network (LAN), a wide area network (WAN), a global network (the Internet), etc. Accordingly, network 306 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

Some level of content editing (e.g., muting/bleeping foul/obscene language, obscuring impolite gestures, etc.) may be performed on the recorded content in the storage/library location 308, perhaps prior to any delivery of the content to consumers. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like.

In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

Figure 3:
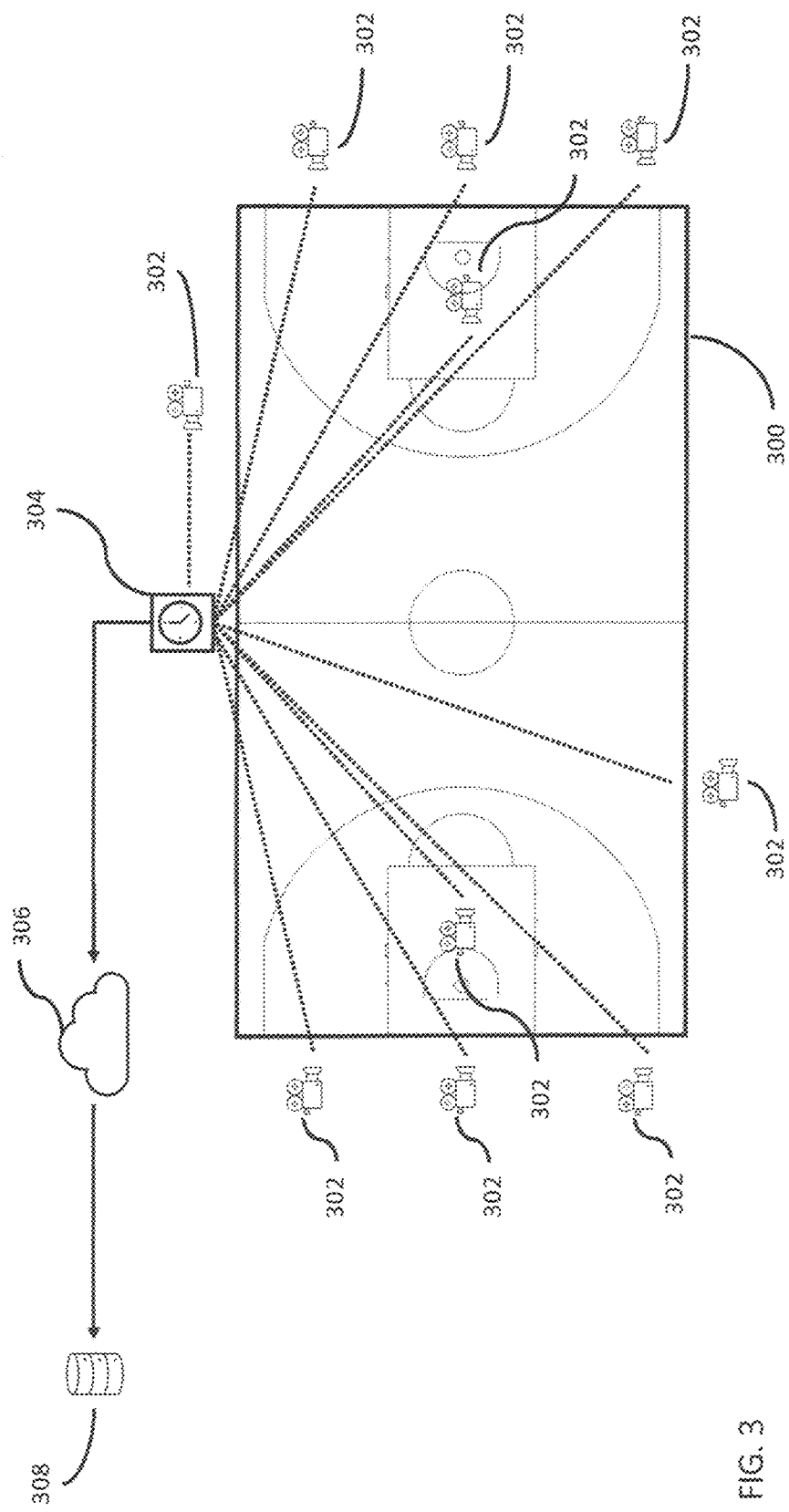
FIG. 3 illustrates an example of application video processing techniques according to the present disclosure.

FIG. 3 illustrates an example of application video processing techniques. One or more techniques may leverage one or more video assets that may be available in venues/arenas hosting sporting events. In one or more techniques, perhaps 360 degrees of coverage, or at least some amount of coverage, of cameras may be placed around a field-of-play to capture one or more video streams. The captured video streams may be sent to a processing unit. One or more streams may be time encoded and/or exported to one or more storage locations (e.g., a cloud-based storage facility).

Shown in FIG. 3 are a plurality of video capture devices 302, such as, for example, cameras, installed in various locations near sport venue 300. In one or more techniques, video capture devices 302 may send captured video to a processing unit 304. One or more such recordings may be time encoded by processing unit 304 and/or exported by processing unit 304 to one or more storage locations 308 (e.g., a cloud-based storage facility). In at least one technique, one or more such recordings may be exported by processing unit 304 to one or more storage locations 308 via network 306.

In one or more techniques, one or more algorithms (e.g., Artificial Intelligence (AI) algorithms, among other kinds of algorithms) may be used to screen for offensive content, perhaps for example in real-time or near real time, among other times. Stored and/or processed video content may be available for access via a secure API, or the like. In one or more techniques, processed video content may be combined with processed audio content for delivery to a requesting consumer.

Figure 4A:
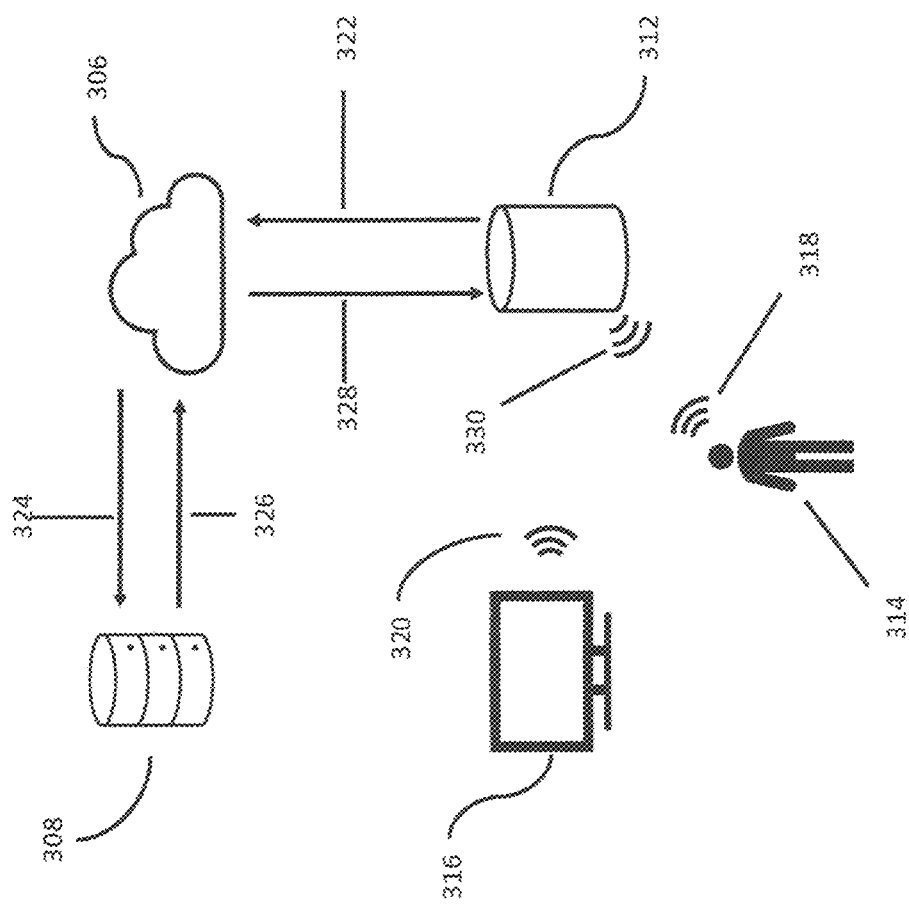
FIG. 4A illustrates an example of enhanced audio and/or video delivery techniques according to the present disclosure.
Figure 4B:
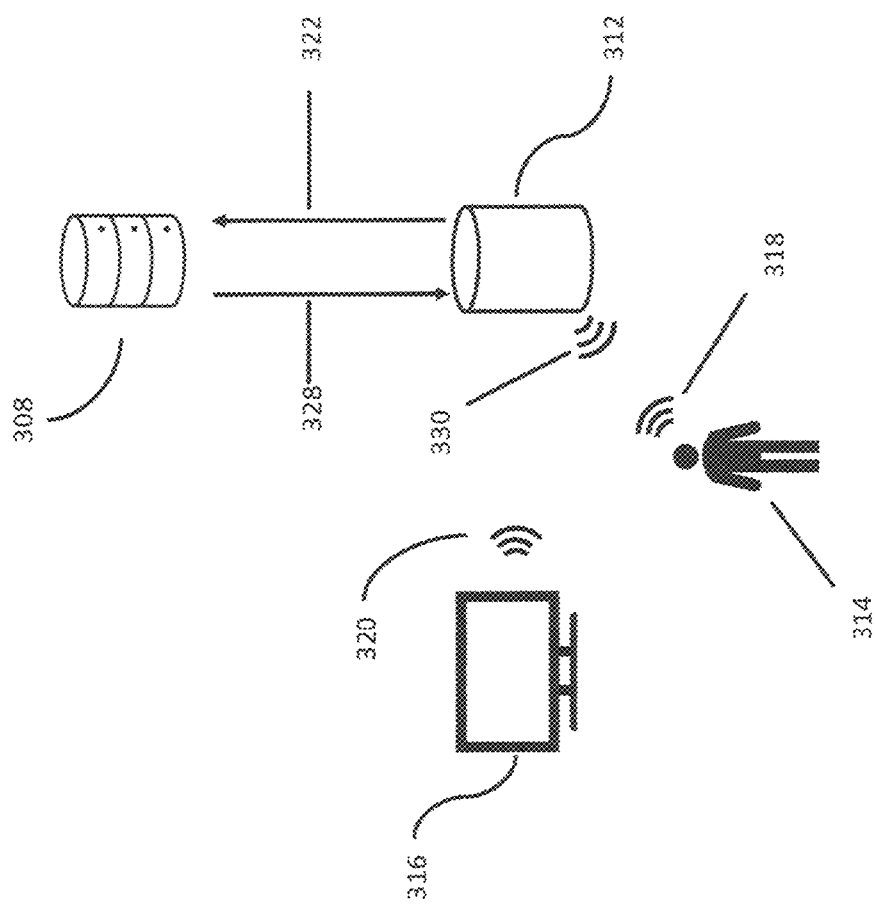
FIG. 4B illustrates an example of enhanced audio and/or video delivery techniques according to the present disclosure.
Figure 5:
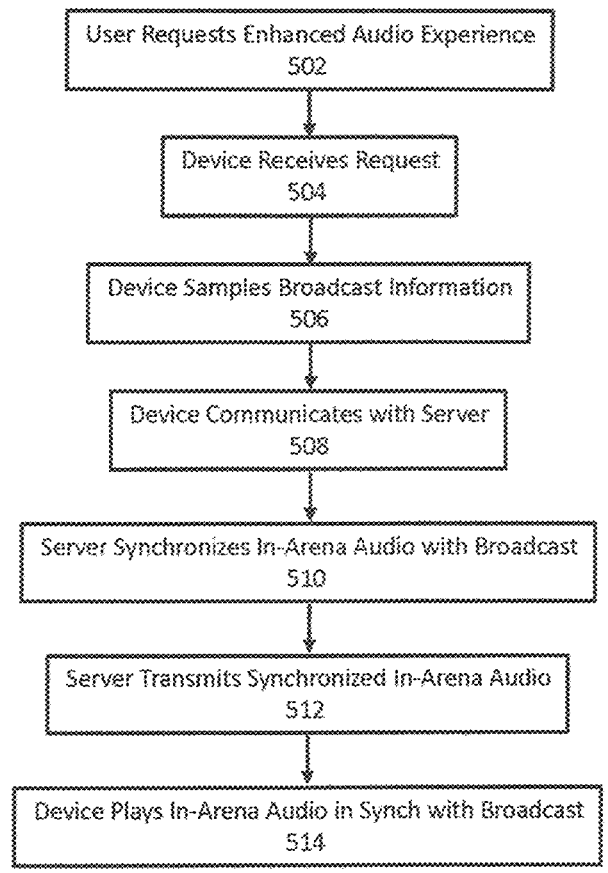
FIG. 5 is a flowchart showing a method of communicating an event experience according to the present disclosure.

FIGS. 4A-B and FIG. 5 illustrate examples of enhanced content delivery techniques. Shown in FIGS. 4A-B are network 306, storage locations 308, content access device 312, media delivery device 316, and consumer 314. In at least one technique, content access device 312 comprises one or more computing devices 104 configured by way of hardware, firmware, software, and/or circuitry, and/or a combination thereof to perform the functions described herein. Any such firmware and/or software may be embodied in or on computer readable media. In at least one technique, content access device 312 comprises a smart phone, such as, for example, a smart phone sold by Apple™, Google™, Samsung™, and/or other vendors. In at least one technique, content access device 312 comprises a smart speaker, such as, for example, a smart speaker sold by Amazon™, Google™, Sonos™, and/or other vendors. In at least one technique, media delivery device 316 comprises one or more computing devices 104 configured by way hardware, firmware, software, and/or circuitry, and/or a combination thereof to perform the functions described herein. Any such firmware and/or software may be embodied in or on computer readable media. In at least one technique, media delivery device 316 comprises a television, such as, for example, a television sold by Samsung™, LG™, Sony™ and/or other vendors.

At block 502 of FIG. 5, consumer 314 requests that content access device 312 deliver enhanced content 330, such as, for example, by way of voice command 318 given to content access device 312. Alternatively, consumer 314 may issue a command to content access device 312 by way of any interface technique that is compatible with content access device 312.

At block 504 of FIG. 5, content access device 312 processes the request for delivery of enhanced content 330.

At block 506 of FIG. 5, content access device 312 obtains a sample of broadcast information 320 from media delivery device 316. For example, in at least one technique, content access device 312 may be equipped with a microphone that is capable of receiving broadcast information 320 in audio form. Alternatively, content access device 312 may obtain a sample of broadcast information 320 from media delivery device 316 by way of any technique that is compatible with content access device 312 and media delivery device 316. In at least one technique, content access device 312 may time encode broadcast information 320 (e.g., with a universal clock service, GPS, or the like).

At block 508 of FIG. 5, content access device 312 communicates the request for enhanced content and broadcast information 320 to storage location 308. As shown in FIG. 4A, signals 322/324, comprising the request for enhanced content and broadcast information 320, are transmitted to storage location 308 via network 306. As shown in FIG. 4B, signal 322, comprising the request for enhanced content and broadcast information 320, is transmitted to storage location 308. In this configuration, there is no use of a network 306.

At block 510 of FIG. 5, storage location 308 processes the request of delivery of enhanced content 330 and broadcast information 320. Storage location 308 compares broadcast information 320 to time encoded recordings stored on storage location 308 so as to synchronize the time encoded recordings stored on storage location 308 with the media then being delivered through media delivery device 316.

Figure 6:
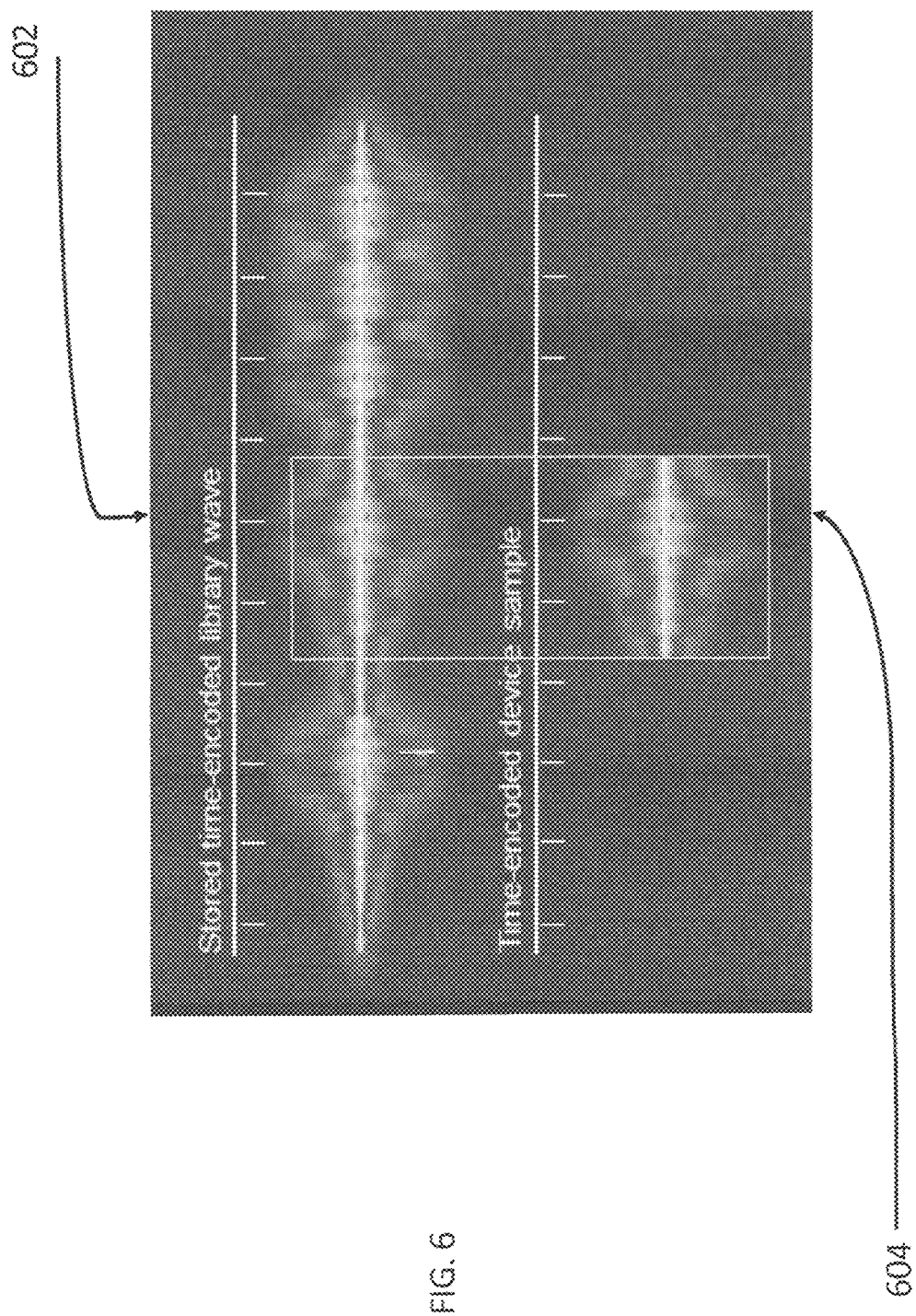
FIG. 6 illustrates an example of an application coding/encoding and comparison techniques according to the present disclosure.

FIG. 6 illustrates an example of an application coding/encoding and comparison techniques. FIG. 6 illustrates a sample "lookup" process that may be used to identify the requested sporting event content by one or more techniques. As shown on FIG. 6, a time encoded recording 602 is retrieved by storage location 308 and compared to sample 604. Sample 604 may comprise all of, or any portion of, broadcast information 320, or may be algorithmically derived from all of, or any portion of, broadcast information 320. In one or more techniques, the lookup process may also determine the most suitable timing alignment for the sporting event content, perhaps for example, based on a timing comparison between a consumer provided timing sample and a timing in the encoded sporting event content in a storage location/library.

In one or more techniques, the use of universal clock may be useful, perhaps for example to ensure a best possible alignment of a sample code with encoded content in one or more storage locations. In one or more techniques, the sampling/comparison process may continue to run in background, perhaps for example to ensure devices may stay time aligned throughout broadcasted event, among other reasons.

Returning to block 510 of FIG. 5, storage location 308 may employ further processing techniques upon the request of delivery of enhanced content 330 and broadcast information 320. For example, storage location 308 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

At block 510 of FIG. 5, storage location 308 may employ other processing techniques upon the request of delivery of enhanced content 330 and broadcast information 320. For example, in one or more techniques, one or more augmented services/content can be added to enhanced content 330, perhaps enhancing advertisements made during the sports event broadcast and/or original broadcast, with the capability for direct product fulfillment and/or requests for additional information for advertised goods and/or services requested via content access device 312 and/or another device At block 512 of FIG. 5, storage location 308 communicates enhanced content 330 to content access device 312. As shown in FIG. 4A, signals 326/328, comprising enhanced content 330, are transmitted to content access device 312 via network 306. As shown in FIG. 4B, signal 326, comprising enhanced content 330, is transmitted to content access device 312. In this configuration, there is no use of a network 306.

At block 514 of FIG. 5, enhanced content 330 is delivered by content access device 312, such as by audio and or video emitted by content access device 312. Enhanced content 330 will be at least substantially in synchronization with the media then being delivered through media delivery device 316. Content access device 312 may employ further processing techniques on enhanced content 330 prior to delivery. For example, content access device 312 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

Figure 7:
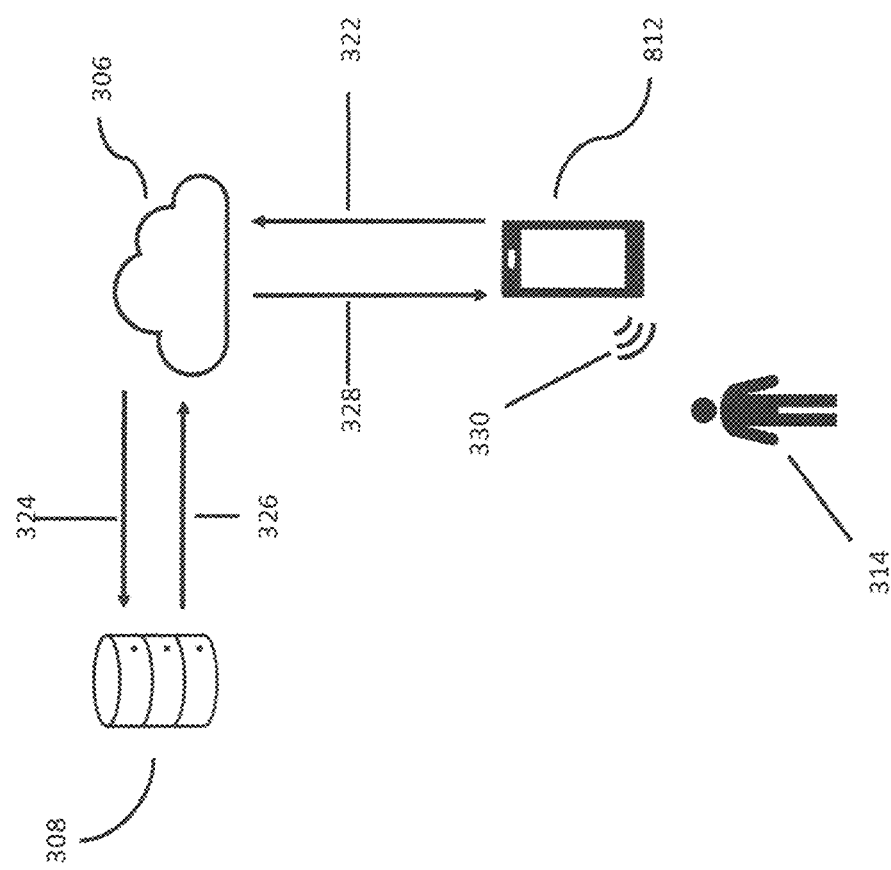
FIG. 7 illustrates an example of enhanced audio and/or video delivery techniques according to the present disclosure.
Figure 8:
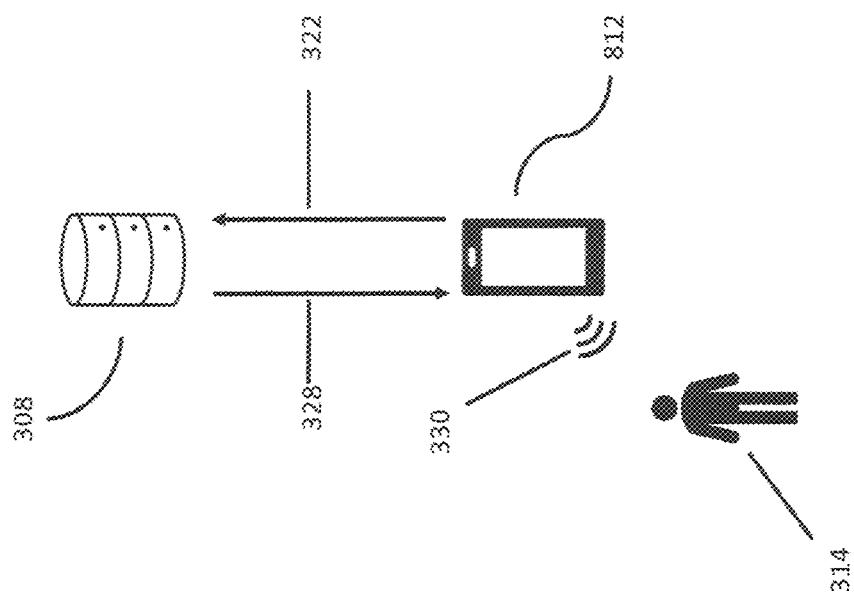
FIG. 8 illustrates an example of enhanced audio and/or video delivery techniques according to the present disclosure.
Figure 9:
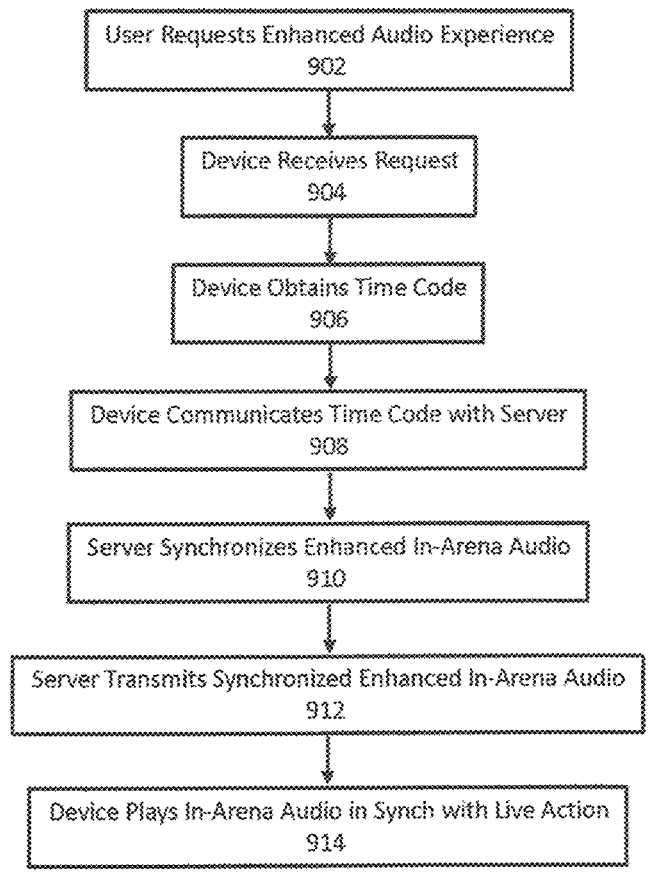
FIG. 9 is a flowchart showing a method of communicating an event experience according to the present disclosure.

FIGS. 7-9 illustrate examples of enhanced content delivery techniques, where a consumer is present at a live event but desires enhanced content regarding the live event. Shown in FIGS. 7-8 are network 306, storage locations 308, consumer 314, and content access device 812. In at least one technique, content access device 812 comprises one or more computing devices 104 configured by way of hardware, firmware, software, and/or circuitry, and/or a combination thereof to perform the functions described herein. Any such firmware and/or software may be embodied in or on computer readable media. In at least one technique, content access device 812 comprises a smart phone, such as, for example, a smart phone sold by Apple™, Google™, Samsung™, and/or other vendors. In at least one technique, content access device 812 comprises a smart speaker, such as, for example, a smart speaker sold by Amazon™ Google™, Sonos™, and/or other vendors.

At block 902 of FIG. 9, consumer 314 requests that content access device 812 deliver enhanced content 330, such as, for example, by way of a voice command given to content access device 812. Alternatively, consumer 314 may issue a command to content access device 812 by way of any interface technique that is compatible with content access device 812.

At block 904 of FIG. 9, content access device 812 processes the request for delivery of enhanced content 330.

At block 906 of FIG. 9, content access device 812 determines a time code corresponding to the request for enhanced content 330. In at least one technique, content access device 812 may time encode the request based on the internal clock on content access device 812, or by way of a universal clock service, GPS, or the like.

At block 908 of FIG. 9, content access device 812 communicates the request for enhanced content and broadcast information 320 to storage location 308. As shown in FIG. 7, signals 322/324, comprising the request for enhanced content and broadcast information 320, are transmitted to storage location 308 via network 306. As shown in FIG. 8, signal 322, comprising the request for enhanced content and broadcast information 320, is transmitted to storage location 308. In this configuration, there is no use of a network 306. For example, storage location 308 may be available within the vicinity of content access device 812.

At block 910 of FIG. 9, storage location 308 processes the request of delivery of enhanced content 330. Storage location 308 compares broadcast information 320 to the time encoding of the request communicated by content access device 812 so as to synchronize the time encoded recordings stored on storage location 308 with the live event then being observed by consumer 314.

In one or more techniques, the use of universal clock may be useful, perhaps for example to ensure a best possible alignment of a sample time code with encoded content in one or more storage locations. In one or more techniques, the sampling/comparison process may continue to run in background, perhaps for example to ensure devices may stay time aligned, among other reasons.

Returning to block 910 of FIG. 9, storage location 308 may employ further processing techniques upon the request of delivery of enhanced content 330. For example, storage location 308 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

At block 910 of FIG. 9, storage location 308 may employ other processing techniques upon the request of delivery of enhanced content 330. For example, in one or more techniques, one or more augmented services/content can be added to enhanced content 330, perhaps enhancing advertisements made during the sports event broadcast and/or original broadcast, with the capability for direct product fulfillment and/or requests for additional information for advertised goods and/or services requested via content access device 812 and/or another device At block 912 of FIG. 9, storage location 308 communicates enhanced content 330 to content access device 812. As shown in FIG. 7, signals 326/328, comprising enhanced content 330, are transmitted to content access device 812 via network 306. As shown in FIG. 8, signal 326, comprising enhanced content 330, is transmitted to content access device 812. In this configuration, there is no use of a network 306. For example, storage location 308 may be available within the vicinity of content access device 812.

At block 914 of FIG. 9, enhanced content 330 is delivered by content access device 812, such as by audio and or video emitted by content access device 812. Enhanced content 330 will be at least substantially in synchronization with the live event then being observed by consumer 314. Content access device 812 may employ further processing techniques on enhanced content 330 prior to delivery. For example, content access device 812 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

In one or more techniques, content may be provided to the consumer via at least two ways. For example, the consumer may use a voice command to access content, and/or the consumer may use one or more applications. For example, a voice command may be "Alexa, play SportSide™", and/or "Hey Google, play SportSide™", and/or the like. In one or more techniques, the sporting event content application(s) may interact with a smart speaker to provide the sporting event content.

For example, a consumer may activate the sporting event content application via a smart speaker and/or a mobile device. The smart speaker and/or the mobile device may receive an audio feed from the device via which the consumer is viewing and/or listening to a broadcast of a sporting event (e.g., real time, delayed, and/or previously recorded). The smart speaker and/or the mobile device may time encode the sampled audio feed (e.g., with a universal clock service, GPS, or the like). The application may command the smart speaker and/or the mobile device to search for one or more sporting event content files on a remote storage location/library that corresponds to the sampled audio feed. Perhaps based on the time code of the sampled audio feed, a time alignment/synchronization may be performed on one or more indicated sporting event content files. The application may cause the one or more indicated sporting event content files to stream to the smart speaker and/or the mobile device. The sporting event content stream may be time adjusted using the synchronization such that the streamed sporting event content may be in substantial timing alignment with the broadcast of the sporting event.

For example, a consumer may activate the sporting event content application via a smart speaker and/or a mobile device. The smart speaker and/or the mobile device may receive a video feed from the device via which the consumer is viewing and/or listening to a broadcast of a sporting event (e.g., real time, delayed, and/or previously recorded). The smart speaker and/or the mobile device may time encode the sampled video feed (e.g., with a universal clock service, GPS, or the like). The application may command the smart speaker and/or the mobile device to search for one or more sporting event content files on a remote storage location/library that corresponds to the sampled video feed. Perhaps based on the time code of the sampled video feed, a time alignment/synchronization may be performed on one or more indicated sporting event content files. The application may cause the one or more indicated sporting event content files to stream to the smart speaker and/or the mobile device. The sporting event content stream may be time adjusted using the synchronization such that the streamed sporting event content may be in substantial timing alignment with the broadcast of the sporting event.

In one or more techniques, a voice command may be a more useful way to gain general access to (e.g., high-level) sporting event content. Engaging sporting event content from an in-home smart speaker's application may unlock one or more enhancements that may include one or more of: general courtside audio, celebrity commentary, and/or virtual reality (VR) overlays, among other enhancements, for example.

One or more of the enhancements may have an associated financial charge (e.g., up-charge) that may provide revenue sharing opportunity incentives. In one or more techniques, perhaps hundreds of "celebrity" commentaries could be available from one or more of: Hollywood, YouTube, Instagram, Twitter stars, and/or international stars, among others, perhaps bringing entirely new audiences to the sporting event (e.g., professional basketball) via the sporting event content experience.

In one or more techniques, a "Friends and Family" mode of the sporting event application may allow at least one consumer to invite one or more other consumers to experience a game together. For example sporting event content audio may play in the background of the experience, while the connected microphones may remain open allowing the one or more consumers to talk to each other about the game (e.g., in real-time) through the smart speaker devices/network. The sporting event content application may coordinate/configure the network of consumer's smart speakers and/or mobile devices for the "conference" experience. In one or more techniques, this "conference" experience can be setup, perhaps for example as long as the invited consumers are able to view the same sporting event broadcast at substantially similar times. In one or more techniques, it may be useful for the "conference" feature for one or more, or each, individual sporting event content delivery to be in relatively close synchronization (sync).

In one or more techniques, the sporting event content might not require any changes to a conventional broadcast of the sporting event. In one or more techniques, the sporting event content may provide one or more respective sports players a channel to build their brand with one or more consumers directly. One or more techniques may allow one or more consumers to experience one or more aspects (e.g., sights and/or sounds) of the sporting event that few sports fans may ever see and/or hear, perhaps in some instances, even sports fans who attend the sporting event live and in person.

One or more techniques may provide one or more advertisers the ability to interact with numerous consumers and/or may provide the advertisers to (e.g., directly) fulfill one or more products/services/information that a consumer may order and/or may make an inquiry regarding.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A device for providing an event content stream coupled to one or more content enhancements, the device comprising:
   a microphone;
   a speaker;
   a transceiver; and
   a processor, said processor configured at least to:
     receive an audio feed via said microphone;
     assign a time code to said audio feed;
     compare a sample of said audio feed to a waveform stored in one or more cloud-based content libraries via one or more application programming interfaces (APIs);
     transmit a request from a user of said device for a service via an event content application;
     receive an event content stream from a remote storage location based on said compared sample, said event content stream corresponding at least to said audio feed, and said event content stream being time aligned based at least on said time code; and
     provide at least a part of said event content stream via at least said speaker whereby a user of said device is enabled to receive said one or more content enhancements based on a service requested by said user via an event content application.

2. The device of claim 1, further comprising:
   a display, and wherein said processor is further configured to provide at least a part of said event content stream via at least said display.

3. The device of claim 1, further comprising: a camera; and
a display,
wherein said processor is further configured to:
receive a video feed via said camera, said event content stream further corresponding to said video feed; and
provide at least a part of said event content stream via at least said display.

4. The device of claim 1, wherein said audio feed is generated from a broadcast of a sporting event.

5. The device of claim 4, wherein said event content stream comprises at least audio captured at said sporting event.

6. The device of claim 1, wherein said event content stream comprises an advertisement for a product, and wherein said processor is further configured to:
receive a second audio feed via said microphone, said second audio feed comprising at least an order for said product; and
deliver said order to an order processor.

7. A method for communicating an enhanced event experience having one or more content enhancements, the method comprising the steps of:
receiving a request from a user of a first device for a service via an event content application;
obtaining, with said first device, broadcast information from a broadcast emitted from a second device, wherein said broadcast information is based at least on an audio feed of said broadcast;
comparing said broadcast information to a waveform corresponding to a time encoded recording via one or more application programming interfaces (APIs);
synchronizing said time encoded recording with said broadcast information;
transmitting said one or more content enhancements enhanced content to said first device, said one or more content enhancements enhanced content being based at least on said time encoded recording; and
delivering said one or more content enhancements said enhanced content by way of said first device, said one or more content enhancements said enhanced content being in time alignment with said broadcast emitted from said second device, whereby said user of said first device is enabled to receive said one or more content enhancements based on said service requested via said event content application.

8. The method of claim 7, wherein said one or more content enhancements said enhanced content comprises at least audio content.

9. The method of claim 7, wherein said broadcast information is based at least on a video feed of said broadcast.

10. The method of claim 9, wherein said one or more content enhancements said enhanced content comprises at least video content.

11. The method of claim 7, wherein said one or more content enhancements said enhanced content comprises at least one advertisement.

12. The method of claim 7, wherein said broadcast is of a sporting event.

13. The method of claim 12, wherein said one or more content enhancements said enhanced content comprises at least audio captured at said sporting event.

14. The method of claim 7, further comprising the steps of:
identifying undesirable material in said one or more content enhancements said enhanced content; and
eliminating said undesirable material.

15. A device for providing event content comprising one or more content enhancements, the device comprising:
a memory, said memory comprising at least time encoded event content;
a processor, said processor configured at least to:
receive a time encoded media sample corresponding to broadcast information based at least on an audio feed of a broadcast emitted from a second device;
retrieve said time encoded event content;
compare said time encoded event content to a waveform corresponding to said time encoded media sample via one or more application programming interfaces (APIs); and
produce an event content stream, said event content stream comprising at least a portion of said time encoded event content that is selected based at least on time alignment with said time encoded media sample, whereby said device is enabled to transmit said one or more content enhancements based on a service request received from a user via an event content application.

16. The device of claim 15, wherein said event content stream comprises at least one advertisement.

17. The device of claim 15, wherein said event content stream comprises at least one advertisement for a product, and wherein said processor is further configured to:
receive an order for said product; and
deliver said order to an order processor.

18. The device of claim 15, wherein said processor is further configured to:
identify undesirable material in said event content stream; and
eliminate said undesirable material.

19. The device of claim 18, wherein said undesirable material is obscene language.

* * * * *